2,706,686
Patented Apr. 19, 1955

2,706,686

METHOD OF LACQUERING PHOTOGRAPHIC EMULSIONS AND PRODUCTS PRODUCED THEREBY

Edwin H. Hilborn, Rochester, N. Y., assignor to Eastman Kodak Company, Rochester, N. Y., a corporation of New Jersey No Drawing. Application October 1, 1952,
Serial No. 312,636

3 Claims. (Cl. 95—8)

The lacquering of processed image carrying photographic emulsions, i. e. emulsions which have been exposed, developed, fixed and washed, frequently is desirable in order to provide a water-resistant or finger-print resistant surface, to increase apparent contrast by rendering the surface glossy, or to improve the ease of splicing. However, photofinishers and amateurs find that the lacquering of prints is too time-consuming and hazardous to be employed in most cases. A real obstacle to the application of lacquers on a large scale is presented by the problems incident to the handling of large quantities of solvents.

The present invention relates to a lacquer composition adapted to be applied to photographic emulsions by the manufacturer of the emulsions who will have adequate equipment for handling the solvents in quantity, a final processing of the lacquer being carried out with ease after exposure, development, fixing and washing of the emulsion. The invention more particularly relates to lacquer compositions which it might be said are adapted to be provided as "latent" lacquer coatings on the unexposed emulsion by the manufacturer at the time of preparation of the emulsion coating on its support, the "latent" coatings being developable into permanent fixed lacquer coatings subsequent to exposure of the emulsion and processing of the photographic image.

The invention is based upon a novel lacquer composition with which photographic emulsions can be overcoated prior to exposure, the functional part of the composition, i. e. its lacquer base, providing a coating of a porous, spongy, cellular or foraminous discontinuous nature which has a high degree of permeability to processing solutions and permits photographic exposure and processing through the lacquer. The lacquer base of the composition is also of a nature such that subsequent to processing, washing and drying of the emulsion the discontinuous coating can be fused and coalesced into a continuous coating by the application of heat whereby an impervious layer of lacquer is made to cover the entire surface of the emulsion. The thus coated emulsion is no longer water permeable and has a glossy protective surface.

In accordance with the invention, after an emulsion has been coated onto its support, the emulsion is supplied with an overcoating of the lacquer composition, or if inadequate adhesion is obtained in this way, a primer coat may first be applied. The invention resides in use of a lacquer composition comprising a thermoplastic lacquer base and a sizable amount of a solvent insoluble finely divided particulate material which is removable from the coating by means which will not prove detrimental to the lacquer base portion of the coating or constituents of the emulsion or its support. For convenience of reference, the solvent insoluble finely divided particulate material will be referred to in the present specification and claims as a removable extender. The removable extender may be sublimable or heat decomposable to gaseous products at a slightly elevated temperature non-detrimental to other parts of the coating or emulsion or support. Additionally or alternatively the removable extender may be water soluble whereby it may be washed out of the coating with pure water or dissolved in the photographic processing baths. The expression "solvent insoluble" as applied to the removable extender has reference to the properties of the particulate extender with respect to organic solvents and plasticizers used for solution of the lacquer base. The particle size of the removable extender preferably should be sufficiently small so that individual particles do not have an adverse effect as regards light transmission of the lacquer coating. However, by use of a light transmitting extender or by removal of the extender prior to exposure of the emulsion problems in this connection may be obviated. Normally the lacquer composition will be most satisfactory when a removable extender is employed which has a very small particle size, e. g. substantially all particles smaller than about 200 mesh, although it will be appreciated that the particle size range is by no means critical. Very good results were obtained with a heat decomposable extender testing as follows:

| | Per cent |
|---|---|
| 0 to 0.15 mil | 30 |
| 0.15 to 0.30 mil | 40 |
| 0.30 to 0.50 mil | 15 |
| 0.50 to 0.90 mil | 10 |
| 0.90 to 1.25 mils | 5 |

Obviously the composition in addition may contain operative amounts of plasticizers and solvents for the lacquer base. In any event, upon application of a coating of the composition and removal of the lacquer base solvents by evaporation, the layer which thereby is deposited comprises a film of thermoplastic lacquer base made discontinuous by the presence of numerous finely divided particles of a removable solvent insoluble extender. The thermoplastic lacquer base is of course light transmitting, preferably transparent, thus permitting photographic exposure through the lacquar.

In its most advantageous embodiment the invention contemplates use of a water soluble extender whereby the fine particles go into solution in the aqueous processing bath and are removed from the coating at that time. Subsequent to processing, therefore, the emulsion carries a discontinuous thin layer of thermoplastic lacquer base which variously may be described as spongy, foraminous, imperforate, porous, etc., and which can be fused by application of heat. It is obvious that such a lacquer composition can be applied without difficulty by the manufacturer of the photographic material since the manufacturer ordinarily will be equipped to apply coatings and handle organic solvents in the quantity and manner necessary for such lacquer application.

It will be readily apparent to those skilled in the art that in accordance with the generic concept of the invention as above described, any one of a number of materials may be used in preparation of the lacquer composition, that is, any of numerous thermoplastic materials, solvents, plasticizers, and removable extenders. It will also be apparent that where desirable any of a number of known compositions may be used as a priming layer to obtain adhesion of the lacquer layer to the emulsion.

Requisites of the lacquer base may be outlined generally as follows:

1. It should flow readily and smoothly at some elevated temperature somewhat lower than the charring temperature of the base.
2. It should have a minimum of cold flow at room temperature to avoid danger of fusion of the coating prior to processing.
3. It should be relatively colorless.
4. It should be photographically inactive.
5. It should have some degree of adhesion to the gelatin of the emulsion, both dry and wet. This requirement might be modified somewhat by use of multiple coats, such that the bottom coat will adhere to the emulsion and subsequent coats will stick to this bottom layer.

When a water soluble extender is employed, it may be removed from the lacquer layer by means of a water wash accomplished either at the point of manufacture of the film or during processing after exposure. When a heat decomposable extender is employed which is water insoluble, its removal from the lacquer layer by means of thermal decomposition ordinarily will be accomplished by the manufacturer since a water insoluble extender would in any event necessitate removal prior to processing of an exposed emulsion. In addition, the decomposition temperature of the preferred extenders normally will be lower than the temperatures employed by the manufacturer to remove solvents from the lacquer base. Regardless of whether the extender is removed by decomposition or solution any air holes or bubbles left in the lacquer coating by removal of the extender particles may be collapsed by a final fusion of the lacquer.

The invention is illustrated in the following examples:

*Example 1*

A sheet of photographic paper was overcoated with a primer consisting of:

1.0% photographic gelatin
0.1% acetic acid
0.2% low viscosity, high butyryl cellulose acetate butyrate
50.0% acetone
3.0% water
Balance methanol A ball mill grind was made up consisting of:

5.0% low viscosity, high butyryl cellulose acetate butyrate
5.0% chlorinated diphenyl
2.5% butyl oleate
50.0% ammonium bicarbonate
Balance ethylene dichloride This grind was diluted with an equal volume of ethylene dichloride, applied to the prime-coated photographic paper and dried for five minutes at 125–150° F. to remove the ethylene dichloride and decompose the ammonium bicarbonate.

The paper was subsequently exposed to light, processed in an aqueous developer for one minute, fixed, washed and dried. After drying, the back of the paper was held against a metal surface at 250–300° F. for a few seconds whereupon the lacquer fused to provide a glossy surface on the print.

*Example 2*

A sheet of photograpic paper was overcoated with a primer of the composition illustrated in Example 1 with the exception that the gelatin therein was replaced by zein. Subsequently a suspension of a ball mill grind prepared as indicated in Example 1 with the exception that sodium sulfate was substituted for the ammonium bicarbonate of Example 1, was applied to the primer coat and the solvent removed by volatilization to form a lacquer layer. The coated sensitized paper was subsequently exposed and processed as indicated in Example 1. A good photographic reproduction was obtained with a glossy water impermeable surface on the print.

Of the thermoplastic film forming materials which might be aptly employed, those skilled in the art will readily recognize the applicability of certain thermoplastic cellulose esters and cellulose ethers, and thermoplastic synthetic resins such as alkyd resins, vinyl resins and mixtures of these with or without solvent plasticizers. These may be used in the manner indicated for the cellulose acetate butyrate chlorinated diphenyl mixture disclosed in Example 1. Any number of readily available solvents and plasticizers will suggest themselves.

Large amounts of waxes should probably be avoided because of their water resistance but small amounts might be used to render the melting point of the composition more sharp.

Where a lower degree of adhesion of lacquer to emulsion can be tolerated, the primer coat can be eliminated, or small amounts of gelatin or zein can be added to the lacquer.

Specific removable extenders of applicability are inorganic and organic salts which are solvent insoluble and are water soluble and/or heat decomposable or sublimable, e. g. ammonium carbonate, ammonium bicarbonate, sodium sulfate, and ammonium carbamate. The extender preferably is crystalline in nature but need not be. The ammonium carbonates are preferred since they decompose at about 96° F. and are soluble in cold water. Ammonium carbamate sublimes at 60° C. Additional heat decomposable extenders are disclosed in my copending U. S. patent application Serial No. 168,827, filed June 17, 1950, but some of these require temperatures above the fusion point of some lacquer bases. In my copending U. S. patent application Serial No. 303,401, filed August 8, 1952, there is a further disclosure of the technique of using heat decomposable salts in coating compositions, specifically photosensitive emulsion coatings.

It will be evident from the examples given above that the method used for preparation of the lacquer compositions is not critical. For instance, when a composition containing ammonium carbonate is prepared, the carbonate may be mixed with the organic solvent either before or after the lacquer base has been dissolved in the solvent. Neither does the proportion of extender employed in the composition appear to be critical. Normally approximately 25% to 50% by weight of the lacquer composition should consist of the removable extender. When a heat decomposable or sublimable extender is to be used, almost any amount will cause an adequate porosity in the lacquer coating but as a general rule at least the same amount of extender as lacquer base is employed. As a practical matter 2 or 3 times up to 10 times as much extender as lacquer base may be employed to obtain good permeability of the discontinuous lacquer coating to aqueous solutions without sacrifice of the desired quality in the finished lacquer coating. The depth of the lacquer layer to a certain extent will be a matter of choice as will be recognized by those skilled in the art. Coating thickness of course will be dependent upon the precise composition of the lacquer and the particular conditions to which the coated film is to be exposed. Normally it is desirable to provide as thin a layer as possible with which a hard, smooth, continuous lacquer finish finally may be provided.

I claim:

1. Method for the preparation of a continuous protective thermoplastic lacquer coating on a photographic paper having a gelatinous sensitized photographic emulsion layer comprising the steps of (1) thinly coating the emulsion layer while it is in a light-sensitive photographically unexposed condition with a transparent thermoplastic lacquer containing intimately admixed therewith about 25% to 50% by weight of a finely divided water-soluble extender which is insoluble in components of the lacquer, (2) after the lacquer coating has dried, forming a latent image in the emulsion layer by photographic exposure through the lacquer, (3) contacting the exposed emulsion layer with an aqueous developing solution, thereby dissolving from the lacquer coating the water-soluble extender and developing the latent image with developing solution which reaches the emulsion through perforations resulting from removal of the water-soluble extender, (4) fixing the developed image, (5) washing and drying the emulsion, and (6) heating the coated surface of the emulsion layer to a temperature below the char point of the lacquer but above the fusion point thereof, thereby providing a glossy water repellent continuous lacquer film on the surface of the emulsion layer.

2. A photographic element comprising a photographic paper having a gelatinous sensitized photographic emulsion layer coated with a thin layer of thermoplastic composition selected from the group consisting of cellulose esters, chlorinated diphenyls, cellulose ethers, alkyd resins, and vinyl resins, said thermoplastic composition having admixed therewith about 25% to 50% by weight of a finely divided removable extender selected from the class consisting of ammonium carbamate, ammonium acid carbonate, sodium sulfate and ammonium carbonate.

3. A photographic element as defined in claim 2 in which the coating consists of a mixture of cellulose acetate butyrate, chlorinated diphenyl, and solid particulate ammonium bicarbonate.

References Cited in the file of this patent

UNITED STATES PATENTS

| | | |
|---|---|---|
| 2,095,018 | Wilmanns et al. | Oct. 5, 1937 |
| 2,119,724 | Staud | June 7, 1938 |
| 2,214,205 | Potter et al. | Sept. 10, 1940 |
| 2,349,613 | Chollar | May 23, 1944 |
| 2,478,879 | Ten Broeck | Aug. 9, 1949 |
| 2,498,621 | Kropa | Feb. 21, 1950 |
| 2,504,208 | Locke | Apr. 18, 1950 |